United States Patent [19]

Leffingwell

[11] 4,107,239

[45] Aug. 15, 1978

[54] PHENOLIC-ACRYLIC FAST-CURING SEALANT SYSTEM

[75] Inventor: Bruce Leffingwell, Hartford, Conn.

[73] Assignee: MPB Corporation, New Britain, Conn.

[21] Appl. No.: 635,166

[22] Filed: Nov. 25, 1975

Related U.S. Application Data

[62] Division of Ser. No. 517,736, Oct. 24, 1974, Pat. No. 3,957,907.

[51] Int. Cl.$^2$ ............................................. C08L 33/00
[52] U.S. Cl. ..................................... 260/881; 260/883; 260/884; 260/885; 260/886
[58] Field of Search .................... 260/885, 51.5, 873, 260/886, 501.1, 883, 501.17, 884, 881, 844

[56] References Cited

U.S. PATENT DOCUMENTS

| | | | |
|---|---|---|---|
| 2,204,517 | 6/1940 | Strain | 260/844 |
| 2,220,834 | 11/1940 | Bruson et al. | 260/268 R |
| 2,373,488 | 4/1945 | Marks | 260/885 |
| 2,646,416 | 7/1953 | Parker | 260/866 |
| 3,436,373 | 4/1969 | Cox et al. | 260/51.5 |
| 3,957,907 | 5/1976 | Leffingwell | 260/873 |

*Primary Examiner*—J. Ziegler
*Attorney, Agent, or Firm*—Pennie & Edmonds

[57] ABSTRACT

The admixture of the tri(hydromethacrylate) of tris(-dimethylaminomethyl)phenol with conventional monomer and polymer components of vinylpolymerizable liquid sealants yields compositions which have accelerated cure times and superior adhesion.

6 Claims, No Drawings

PHENOLIC-ACRYLIC FAST-CURING SEALANT SYSTEM

This is a division, of application Ser. No. 517,736 filed Oct. 24, 1974, now U.S. Pat. No. 3,957,907.

BACKGROUND OF THE INVENTION

This invention provides new fast-curing liquid adhesives for laminating and sealant purposes.

Known adhesive compositions which cure in the presence of free-radical catalysts, often called vinyl-polymerizable sealants, are generally based on syrupy solutions containing various olefinically unsaturated monomers and various compatible polymers. Thus, for example, U.S. Pat. No. 3,333,025 discloses compositions comprising monomeric styrene and methyl methacrylate and their partially polymerized copolymers in the presence of polychloroprene and optionally up to 5% acrylic acid. U.S. Pat. No. 3,725,504 discloses similar compositions containing also acrylate polymers such as interpolymers of methyl methacrylate and ethyl acrylate, and containing about 8 to 12% of monomeric methacrylic acid. Compositions such as these are cured through the catalytic agency of a free-radical donor such a benzoyl peroxide or azobisisobutyronitrile.

In commercial application of such adhesive systems, there is an ever-increasing demand for rapid cure, i.e. there is a requirement for short "cure time", defined as the duration of time between the time of contacting the composition with catalyst and the time when the assembly bearing the adhesive can be easily handled without causing relative movement of the joined parts.

Formulations of the prior art commonly provide "cure times" of around a half-hour. More quickly curing variations can be made which become set in about ten minutes or in some cases even as quickly as about five minutes, but this is often at the expense of other desirable properties such as flexibility, toughness, adhesive bonding strength or storage stability of the uncatalyzed composition. Furthermore, in the design of many commercial operations, there is now a trend toward even shorter cure-times, of the order of one minute.

The new adhesives of this present invention contain substantial amounts of tris(dimethylaminomethyl)-phenol. To the best knowledge of the inventor, there has been no prior disclosure of any composition containing acrylate or related ethylenically unsaturated monomers together with tris(dimethylaminomethyl)-phenol. Perhaps one of the reasons for this is that other phenolic derivatives such as, for example, hydroquinone and catechol are known to be inhibitors of free-radical polymerization of olefinically unsaturated monomers even when present in relatively small amounts.

SUMMARY OF THE INVENTION

A means has now been found whereby storage-stable vinyl-polymerizable liquid sealants can be made which provide both accelerated curing rates and superior adhesion.

Briefly stated, the present invention provides a composition comprising from about 5% to 90% by weight of the salt formed by reacting three mols of methacrylic acid with one mol of tris(dimethylaminomethyl)phenol in admixture with conventional olefinically unsaturated monomers and optionally with conventional compatible polymers.

Exemplarily, it has been surprisingly found that a conventional vinyl-polymerizable sealant capable of curing in the presence of benzoyl peroxide within about 5–10 minutes is made to cure within about one minute by the admixture of as little as 5% or less, by weight, of the tri(hydrometharylate) of tris(dimethylaminomethyl)phenol. Likewise, when a conventional sealant already contains methacrylic acid, its curing is accelerated by the addition of up to one mol of tris(dimethylaminomethyl)phenol for every 3 mols of methacrylic acid. Changing the composition thus to include the tri(hydromethacrylate) of tris(dimethylaminomethyl)phenol also has the effect of substantially increasing shear strength.

DETAILED DESCRIPTION

The base, tris(dimethylaminomethyl)phenol whose methacrylic acid salt is used in this invention is obtainable by Mannich condensation of phenol, formaldehyde and dimethylamine, as disclosed in U.S. Pat. Nos. 2,033,092 and 2,220,834. This base is available as a commercial product under the proprietary name "DMP-30" comprising substantially the 2,4,6-isomer, containing about 0.7% water, and boiling at 143–149° C at 3 mm Hg. This product has been recommended as an intermediate in synthesis of wetting agents and emulsifiers and as a polymerization inhibitor. It has found extensive use as a catalyst in the manufacture of epoxy and polyurethane resins.

The salt used in the compositions of this invention is formed by reacting three mols of methacrylic acid with one mol of the base, tris(dimethylaminomethyl)phenol, corresponding to the use of 258 grams of pure methacrylic acid per 265 grams of pure base. While it is preferred to use pure materials, when commercial grades are used, the relative amounts to form the salt are calculated on the basis of their pure content.

The salt, hereinafter sometimes designated as the "tris" salt, can be prepared as a first step before admixing with the remaining constituents of the composition of this invention. Alternatively, the methacrylic acid and base can each be added individually to the composition whereby the salt is formed in situ on mixing.

It is generally desirable to use at least the stoichiometric amount of methacrylic acid, namely 258/265 or 0.97 parts by weight of the acid per one part of the base. It is preferred to use the methacrylic acid in excess of the stoichiometric amount, for example in at least one percent excess over the stoichiometric amount. While excess methacrylic acid in amount up to 20% of the total composition can give benefits of this invention, it is preferred to use the methacrylic acid in amount corresponding to from about 0.1% to 5% of the total composition weight. Thus when the amount of "tris" salt used is to be around 25% of the total composition, it is convenient to admix in overall about equal weights of methacrylic acid and tris(dimethylaminomethyl)phenol.

Monomers which can be used in admixture with the "tris" salt in the composition of this invention include any liquid or soluble olefinically unsaturated compounds capable of polymerizing by free-radical catalysis, i.e. capable of vinyl polymerization. The lower alkyl acrylates and methacrylates are particularly suitable, including methyl acrylate, methyl methacrylate, ethyl acrylate, ethyl methacrylate, n-propyl acrylate, n-propyl methacrylate, n-butyl acrylate, n-butyl methacrylate, isobutyl acrylate, isobutyl methacrylate, secondary butyl acrylate, tertiary butyl acrylate, tertiary butyl methacrylate, the amyl(meth)acrylates and the hexyl(meth)acrylates. Small amounts of higher acrylates or methacrylates may also be included as for the purpose of increasing the composition viscosity small amounts of 2-ethyl hexyl acrylate can be added. Monomers such as methacrylamide or acrylamide which are solid at ambient temperatures can be included in amounts sufficiently low to maintain their solubility in the liquid composition, as will be understood by those skilled in the art. There can also be used styrene, acrylonitrile, vinyl acetate, vinyl propionate, vinyl chloride, chloroprene, acrylic acid, methacrylic acid or itaconic acid and the like. The preferred liquid monomer is methyl methacrylate.

Optionally, the composition can also include a polymer such as conventionally used in vinyl-polymerizable adhesive compositions for purposes of thickening or making more syrupy. Such a polymer can be a polyester or it can be an acrylic or vinyl-acrylic polymer or "pre-polymer".

Polyesters which are particularly suitable for use in compositions if this invention are those derived by reaction of at least one dihydric alcohol with at least one difunctional organic acid. Suitable dihydric alcohols include ethylene glycol, propylene glycol, neopentyl glycol and the like. Difunctional acids can be saturated or unsaturated, straight-chained branched or benzenoic and include malonic, succinic, glutaric, adipic, pimelic, suberic, azelaic, sebacic, malic, maleic, fumaric, phthalic and isophthalic acids. Particularly suitable polyesters include polyesters of 4 mols ethylene or propylene glycol with 1 to 3 mols of isophthalic or phthalic acid and correspondingly 3 to 1 mols of maleic or fumaric acids.

When the polymer used is an acrylic or vinyl-acrylic polymer or "pre-polymer", the monomers polymerized or co-polymerized therein can be, singly or in combination, a lower alkyl acrylate or methacrylate such as those above enumerated, or styrene, acrylonitrile, vinyl acetate, vinyl propionate, vinyl chloride, acrylamide, methacrylamide, chloroprene, acrylic acid, methacrylic acid, itaconic acid, or the like. Exemplarily, the polymer can be polychloroprene or a copolymer of methyl methacrylate and ethyl acrylate or a copolymer of methyl acrylate and vinyl acetate.

The composition of this invention can include also small amounts of various adjuvant substances conventionally used in the making of adhesives of this sort, such as crosslinking agents, redox agents and the like. Thus there can be added up to 10% by weight, preferably up to about 5%, of triallyl cyanurate, allyl methacrylate, allyl sorbate, diethylene glycol diacrylate, vinyl crotonate or the like, as well as small amounts of various tertiary amines such as trimethylamine, diethylpropylamine, tripropylamine, tri-isopropylamine, tri-n-butylamine, tri-isobutylamine, tri-tertiary-butylamine, benzyl dimethylamine, triethanolamine, ethyl dimethylamine, 2-diethylaminoethanol, piperidine, dimethyl aniline, diethylaniline, dimethyl-p-toluidine, dimethyl-o-toluidine, diethyl-p-toluidine and the like. When a tertiary amine is used, amines with low degree of volatility are most suitable, dimethyl-p-toluidine being preferred.

In summary, the three main components of the compositions of this invention can be used in the following effective ranges of parts by weight per 100 parts

|  | Permissible | Preferred | Most preferred |
| --- | --- | --- | --- |
| "Tris-salt" | 5–90 | 15–50 | 20–30 |
| Monomer (s) | 10–90 | 30–60 | 40–50 |
| Polymer (s) | 0–60 | 10–40 | 20–30 |

Compositions of this invention have been kept in storage for as long as one year or longer without significant change in properties. In order to become polymerized or cured they are placed into contact with a sufficient amount of conventional free-radical catalyst for vinyl polymerization, i.e. any substance capable of yielding by scission or under influence of a reducing agent a moiety having an unshared electron. Such free-radical donors are exemplarily benzoyl peroxide, lauroyl peroxide, cumene peroxide or hydroperoxide, tertiary butyl peroxide or hydroperoxide, azobisisobutyronitrile or the like. The free-radical catalyst can be added to the composition of this invention either by itself or in a suitable solvent, just prior to application of the resulting adhesive to the surface or surfaces to be bonded. Characteristically such addition can be made in an amount corresponding to between about one and five percent by weight of catalyst, based on weight of composition used. Exemplarily a paste can be prepared from equal parts by weight of benzoyl peroxide and dibutyl phthalate, and 3% of this paste is used, based on the weight of the sealant.

Alternatively, one or both of the surfaces to be bonded is first primed with a solution or lacquer containing the catalyst in amount so as to effect the desired ratio of catalyst to sealant at the locus of adhesion. According to a well-known procedure in the prior art, benzoyl peroxide, for example, is dissolved in an appropriate solvent together with a compatible polymer in sufficient amount to thicken the solution into a lacquer which will stay in place on the primed surface while the solvent evaporates. Such a lacquer can be prepared, for example from 10 parts benzoyl peroxide, 5 parts of polymethyl methacrylate, and 85 parts trichloroethylene or a 50/50 mixture of trichloroethylene and methyl isobutyl ketone. Alternate polymers can be selected from the acrylic or vinyl-acrylic polymers described on page 6 above.

The sealants of the present invention can be used to bond a wide variety of substrates including metals, synthetic plastics and other polymers, glass, ceramics, wood and the like. After treatment and assembly of the surfaces to be bonded as above described, the assembly is permitted to stand. As stated, one of the principal features of the present adhesives is that within a relatively brief period after application of the adhesive and joining of the parts to be bonded, the bonded assembly can be handled.

It is obvious that traces of grease, lacquers and the like as well as certain electro-plated coatings in the case of some metal substrates, may retard polymerization or decrease the attainable bond strength. For this reason, it is desirable to remove such traces of grease or lacquer, conveniently by solvent treatment, before applying the adhesive and catalyst system of this invention.

This invention will be further illustrated by description in connection with the following specific examples of the practice of it wherein as also elsewhere herein proportions are in parts by weight unless stated otherwise.

EXAMPLE I

A solution was prepared of 45 parts by weight methyl methacrylate monomer, 12.8 parts methacrylic acid, 12.8 parts tris(dimethylaminomethyl)phenol, 4.6 parts triallyl cyanurate, 0.8 parts dimethyl-p-toluidine and 24.0 parts of a commercial glycol isophthalic polyester resin powder, Aropol 7200MC. (This commercial polyester had specific gravity 1.20, acid number 10 and an SPI gel time of 7.5 minutes at 180° F in the presence of 1% benzoyl peroxide.)

This solution was stable indefinitely at room temperature.

A drop of this solution was placed between solvent-wiped clean steel coupons primed with a polyacrylic lacquer containing about 5% benzoyl peroxide (Hughson Chemical Corp. Accelerator No. 4.) The coupons were bonded together in 45 seconds and had a shear strength of 3500 psi after 2 hours at room temperature.

EXAMPLE II

A solution of 18.2 grams tris(dimethylaminomethyl)phenol, 18.2 grams of methacrylic acid, 70.0 grams methyl methacrylate and 1.1 grams diethyl-p-toluidine was prepared. A drop of this solution was placed between solvent wiped steel coupons primed with a benzoyl-peroxide-acrylic polymer lacquer. The coupons were bonded together in 1 minute 15 seconds and had a shear strength of 1080 psi after 2 hours at room temperature.

EXAMPLE III

To a master solution of 13 parts tris(dimethylaminomethyl)phenol, 26 parts methacrylic acid, 59 parts methyl methacrylate and 1 part N,N-diethyl-p-toluidine, there was added 30 parts of a commercial polyester (ICI, Atlac 387). When this solution was used to bond solvent wiped steel coupons primed with a benzoyl peroxide-acrylic polymer lacquer, curing was obtained in 2 minutes and the shear strength was 2180 psi after 2 hours at room temperature.

EXAMPLE IV

To 100 parts of a proprietary adhesive formulation shown by infra-red analysis to contain at least 10% methacrylic acid (RD 2316-55 manufactured by Hughson Chemical Co.) there was added 10 parts tris(dimethylaminomethyl)phenol. In applying the respective adhesives to clean steel coupons as in the preceding examples, it was found that the addition of the tris(dimethylaminomethyl)phenol reduced the cure time from six minutes and 15 seconds to one minute, and increased the shear strength from 920 psi to 1014 psi after 2 hours at room temperature.

What is claimed is:

1. A storage-stable adhesive composition capable of curing rapidly in the presence of a free-radical catalyst, which composition contains from about 5% to 90% by weight of tris(dimethylaminomethyl)phenol tri(hydromethacrylate); from about 10% to 90% of at least one vinyl-polymerizable monomer and less than about 60% of at least one compatible acrylic polymer or copolymer.

2. The composition of claim 1, wherein said monomer is a lower alkyl acrylate or methacrylate, styrene, acrylonitrile, vinyl acetate, vinyl chloride, vinyl propionate, acrylamide, methacrylamide, chloroprene, acrylic acid, methacrylic acid, or itaconic acid, singly or in combination.

3. The composition of claim 1, wherein said polymer is an acrylic polymer or copolymer containing polymerized therein singly or in combination a lower alkyl acrylate or methacrylate, styrene, acylonitrile, vinyl acetate, vinyl propionate, vinyl chloride, acrylamide, methacrylamide, chloroprene, acrylic acid, methacrylic acid or itaconic acid.

4. The composition of claim 1, wherein the polymer is a copolymer of methyl methacrylate and ethyl acrylate or a copolymer of methacrylate and vinyl acetate.

5. A composition comprising about 15% to 50% by weight tris(dimethylaminomethyl)phenol tri(hydromethacrylate), about 0.1 to 5% methacrylic acid, about 30% to 60% methyl methacrylate and about 10% to 40% of a copolymer of methyl methacrylate and ethyl acrylate or a copolymer of methylacrylate and vinyl acetate.

6. A method of increasing the free-radical catalyzed cure-rate of an adhesive based on at least one olefinically unsaturated monomer and less than about 60% of at least one compatible acrylic polymer or copolymer, which method comprises admixing said adhesive with from about 5% to 90%, based on total weight of admixture, of tris(dimethylaminomethyl)phenol tri(hydrometacrylate).

* * * * *